(12) United States Patent
Bell et al.

(10) Patent No.: US 9,649,948 B2
(45) Date of Patent: May 16, 2017

(54) SELF-LOCATING MULTI-COIL SYSTEM FOR WIRELESS VEHICLE CHARGING

(71) Applicant: Ford Global Technologies, LLC, Dearborn, MI (US)

(72) Inventors: Christopher W. Bell, Livonia, MI (US); Brittany Connolly, Canton, MI (US); James A. Lathrop, Saline, MI (US); John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 14/467,923

(22) Filed: Aug. 25, 2014

(65) Prior Publication Data

US 2016/0052415 A1    Feb. 25, 2016

(51) Int. Cl.
| | | |
|---|---|---|
| *H02J 7/00* | (2006.01) | |
| *H02J 50/00* | (2016.01) | |
| *B60L 11/18* | (2006.01) | |
| *H02J 50/80* | (2016.01) | |
| *H02J 50/90* | (2016.01) | |

(Continued)

(52) U.S. Cl.
CPC ......... *B60L 11/1831* (2013.01); *B60L 11/182* (2013.01); *B60L 11/1825* (2013.01); *B60L 11/1833* (2013.01); *H02J 50/80* (2016.02); *H02J 50/90* (2016.02); *B60L 2230/14* (2013.01); *H02J 7/0042* (2013.01); *H02J 50/10* (2016.02); *H02J 50/40* (2016.02); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01)

(58) Field of Classification Search
None
See application file for complete search history.

(56) References Cited

U.S. PATENT DOCUMENTS 3,585,812 A    6/1971 Parker
4,307,575 A    12/1981 Popinski
(Continued)

FOREIGN PATENT DOCUMENTS

| DE | 102009053915 A1 | 5/2011 | |
|---|---|---|---|
| JP | WO 2014/057905 A1 * | 4/2014 | ............. H02J 17/00 |
| WO | 2013003527 A1 | 1/2013 | |

*Primary Examiner* — Leigh Garbowski
(74) *Attorney, Agent, or Firm* — David Kelley; Brooks Kushman P.C.

(57) ABSTRACT

Electric and plug-in hybrid electric vehicles include a rechargeable traction battery. An automated vehicle charging system is configured to charge the traction battery with minimal operator intervention. The vehicle charging system includes a carousel, including a plurality of transmit coils, configured to move in a longitudinal direction and rotate about an axis. The vehicle charging system further includes at least one controller programmed to move the carousel in the longitudinal direction and rotate the carousel about the axis to align a selected transmit coil from the plurality of transmit coils with a vehicle receive coil. The vehicle charging system may receive positioning data from a vehicle and may move and rotate the carousel according to the positioning data to align the selected transmit coil with the vehicle receive coil.

19 Claims, 4 Drawing Sheets

(51) Int. Cl.
   *H02J 50/10* (2016.01)
   *H02J 50/40* (2016.01)

(56) References Cited

U.S. PATENT DOCUMENTS

| | | | |
|---|---|---|---|
| 4,658,597 A | 4/1987 | Shum | |
| 4,658,599 A | 4/1987 | Kajiwara | |
| 5,237,827 A | 8/1993 | Tchernev | |
| 5,617,003 A * | 4/1997 | Odachi | B60L 11/182 320/108 |
| 5,625,241 A * | 4/1997 | Ewing | H02K 21/12 310/152 |
| 5,654,621 A * | 8/1997 | Seelig | B60L 11/182 320/108 |
| 5,703,461 A * | 12/1997 | Minoshima | B60L 11/182 320/108 |
| 5,821,731 A | 10/1998 | Kuki et al. | |
| 6,474,089 B1 | 11/2002 | Chen | |
| 6,662,572 B1 | 12/2003 | Howard | |
| 6,675,580 B2 | 1/2004 | Ansley et al. | |
| 6,808,450 B2 | 10/2004 | Snow | |
| 7,608,777 B2 | 10/2009 | Bell et al. | |
| 8,008,888 B2 * | 8/2011 | Oyobe | B60L 5/005 320/104 |
| 8,264,197 B2 * | 9/2012 | Shimoyama | B60L 11/182 320/108 |
| 8,459,248 B2 | 6/2013 | Milder et al. | |
| 8,648,249 B1 | 2/2014 | West | |
| 8,796,990 B2 * | 8/2014 | Paparo | H01F 38/14 307/104 |
| 8,933,663 B2 * | 1/2015 | Elias | 320/108 |
| 8,937,454 B2 * | 1/2015 | Baarman | B60L 11/182 180/65.1 |
| 9,126,490 B2 * | 9/2015 | Cook | B60L 11/182 |
| 9,266,405 B1 | 2/2016 | Blanchard | |
| 9,287,720 B2 * | 3/2016 | Kawamura | B60L 11/182 |
| 9,300,169 B1 | 3/2016 | Bardy | |
| 9,321,352 B2 | 4/2016 | Pierce et al. | |
| 9,327,597 B2 | 5/2016 | Kimura | |
| 9,379,571 B2 * | 6/2016 | Boyer | B60L 11/182 |
| 9,409,490 B2 * | 8/2016 | Kawashima | B60L 11/182 |
| 9,505,314 B2 * | 11/2016 | Widmer | B60L 11/1829 |
| 2005/0074646 A1 | 4/2005 | Rajashekara et al. | |
| 2006/0090787 A1 | 5/2006 | Onvural | |
| 2008/0092541 A1 | 4/2008 | Palmer | |
| 2010/0117596 A1 * | 5/2010 | Cook | B60L 11/182 320/108 |
| 2010/0235006 A1 | 9/2010 | Brown | |
| 2011/0221387 A1 * | 9/2011 | Steigerwald | B60L 11/182 320/108 |
| 2012/0043931 A1 * | 2/2012 | Terao | H02J 7/025 320/108 |
| 2013/0033224 A1 * | 2/2013 | Raedy | H02J 7/025 320/107 |
| 2014/0139181 A1 * | 5/2014 | Elias | B60L 11/1811 320/108 |
| 2014/0285030 A1 * | 9/2014 | Nakamura | H02J 5/005 307/104 |
| 2015/0204928 A1 * | 7/2015 | Hoover | H02J 7/0042 320/108 |
| 2015/0214751 A1 * | 7/2015 | Niizuma | B60L 11/182 307/9.1 |
| 2016/0243949 A1 * | 8/2016 | Merkel | H02J 7/025 |

* cited by examiner

US 9,649,948 B2

SELF-LOCATING MULTI-COIL SYSTEM FOR WIRELESS VEHICLE CHARGING

TECHNICAL FIELD

This application generally relates to vehicle battery charging systems.

BACKGROUND

Electric vehicles (EVs) and plug-in hybrid electric vehicles (PHEVs) utilize energy stored in a traction battery to provide electric-only driving range. A vehicle charging station is used to provide energy to the traction battery. The vehicle charging station provides an interface that couples energy to the traction battery of the vehicle. The interface may couple the energy conductively or inductively. The interface is generally a plug that is inserted into a compatible receptacle of the vehicle. The vehicle operator must typically perform a manual operation to insert the plug into the receptacle. The vehicle charging station may require that a number of operations be performed by the vehicle operator in order to initiate the charging process. An automated vehicle charging station can reduce the number of operations performed by the vehicle operator and simplify the charging process for the vehicle operator.

SUMMARY

A vehicle charging system includes a carousel, including a plurality of transmit coils, configured to move in a longitudinal direction and rotate about an axis. The vehicle charging system further includes at least one controller programmed to move the carousel in the longitudinal direction and rotate the carousel about the axis to align a selected transmit coil from the plurality of transmit coils with a vehicle receive coil. The at least one controller may be further programmed to move the carousel and rotate the carousel in response to a location of the vehicle receive coil. The vehicle charging system may further include a lifting mechanism for changing a height of the transmit coils, and the at least one controller may be further programmed to operate the lifting mechanism to change the height of the transmit coils such that a distance between the selected transmit coil and the vehicle receive coil is changed. The at least one controller may be further programmed to receive data from a vehicle indicative of a compatible transmit coil, select one of the transmit coils that is the compatible transmit coil, and move and rotate the carousel to align the compatible transmit coil with the vehicle receive coil. The vehicle charging system may further include a tire location detector configured to output a position of at least one tire of a vehicle within a space defined by the vehicle charging system, wherein the at least one controller is further programmed to move and rotate the carousel based on the position of the at least one tire. The at least one controller may be further programmed to receive data from a vehicle indicative of a location of the vehicle receive coil, and move and rotate the carousel to align the selected transmit coil with the vehicle receive coil based on the location of the vehicle receive coil. The at least one controller may be further programmed to, in response to a command received from the vehicle to adjust a position of the selected transmit coil, move and rotate the carousel to adjust the position of the selected transmit coil according to the command.

A method for operating a vehicle charging system includes receiving, by a controller, data indicative of a compatible transmit coil, data indicative of a tire position, and data indicative of a vehicle receive coil position. The method further includes commanding, by the controller, a carousel, including the compatible transmit coil, to move and rotate based on the tire position and the vehicle receive coil position such that the compatible transmit coil is aligned with a vehicle receive coil. The method may further include commanding, by the controller, a lifting mechanism to change height of the compatible transmit coil relative to the vehicle receive coil to change a distance between the compatible transmit coil and the vehicle receive coil. The method may further include receiving, by the controller, a positioning command from a vehicle and commanding, by the controller, the carousel to move and rotate based on the positioning command. The vehicle receive coil position may be relative to the tire position. The data indicative of a compatible transmit coil may be one or more of a vehicle identifier and a transmit coil identifier.

A vehicle charging system includes a carousel, including a plurality of transmit coils, configured to move in a longitudinal direction and rotate about an axis. The vehicle charging system further includes at least one controller programmed to, in response to receiving positioning data from a vehicle for aligning a selected transmit coil with a vehicle receive coil, move and rotate the carousel according to the positioning data. The positioning data may be relative to a present position of the selected transmit coil. The vehicle charging system may further include a lifting mechanism for changing a height of the transmit coils, and the positioning data may include a height adjustment, and the at least one controller may be further programmed to operate the lifting mechanism according to the height adjustment. The positioning data may be based on an amount of energy transferred from the selected transmit coil to the vehicle receive coil. The positioning data maximizes the amount of energy transferred from the selected transmit coil to the vehicle receive coil. The at least one controller may be further programmed to minimize movement in the longitudinal direction. The at least one controller may be further programmed to minimize rotation about the axis. The at least one controller may be further programmed to position the selected transmit coil by minimum movement in the longitudinal direction and minimum rotation about the axis.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
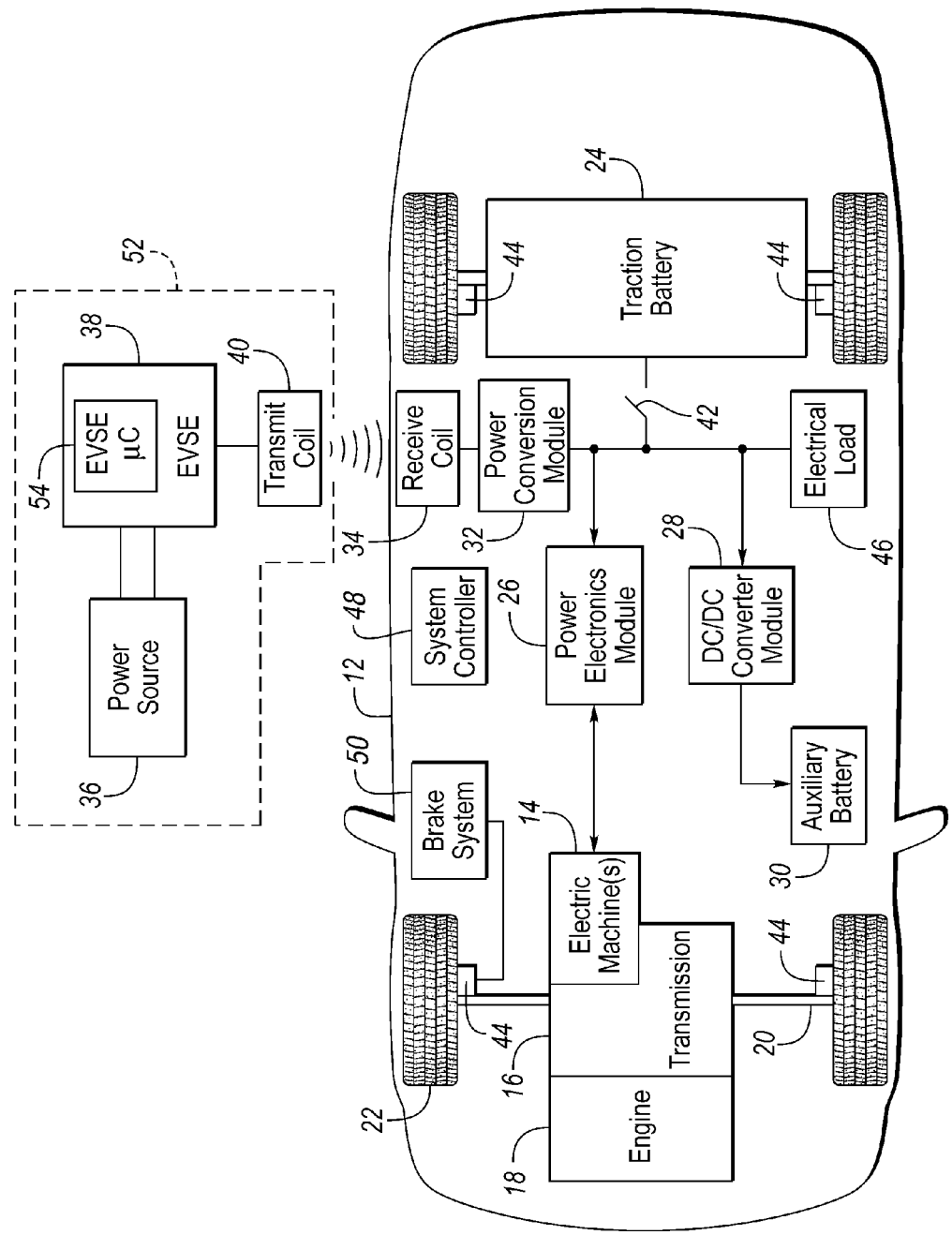
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules 26. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads 46, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by a wireless vehicle charging system 52. The wireless vehicle charging system 52 may include an external power source 36. The external power source 36 may be a connection to an electrical outlet. The external power source 36 may be electrically connected to electric vehicle supply equipment (EVSE) 38. The EVSE 38 may provide a controller 54 to provide circuitry and controls to regulate and manage the transfer of energy between the power source 36 and the vehicle 12. The external power source 36 may provide DC or AC electric power to the EVSE 38. The EVSE 38 may be coupled to a transmit coil 40 for wirelessly transferring energy to a receive coil 34 of the vehicle 12. The receive coil 34 may be electrically connected to a charger or on-board power conversion module 32. The receive coil 34 may be located on an underside of the vehicle 12. The power conversion module 32 may condition the power supplied to the receive coil 34 to provide the proper voltage and current levels to the traction battery 24. The power conversion module 32 may interface with the EVSE 38 to coordinate the delivery of power to the vehicle 12.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be connected to the high-voltage bus. The electrical loads 46 may have an associated controller that operates and controls the electrical loads 46 when appropriate. Examples of electrical loads 46 may be a heating module or an air-conditioning module.

The wireless vehicle charging system 52 may define an area (e.g., a parking space) for parking the vehicle 12 for charging. The area may be suitable for charging a variety of different sized vehicles. The wireless vehicle charging system 52 may provide visual feedback to a vehicle operator. The visual feedback may include one or more indicators to indicate that charging is in progress, charging is completed, or that a diagnostic condition is present that inhibits charging. The visual feedback may be part of a display that is external to the vehicle or within the vehicle.

Figure 2:
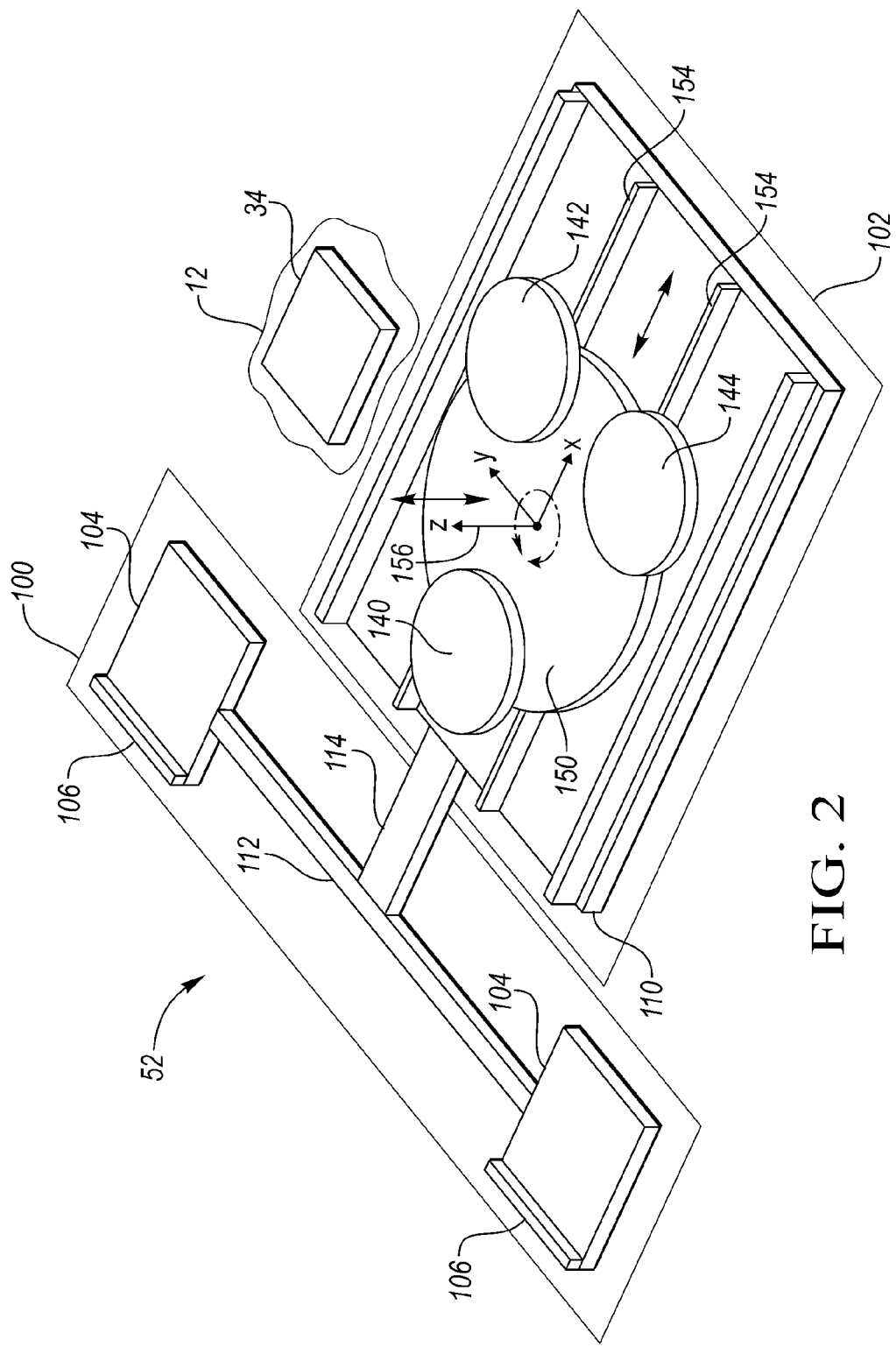
FIG. 2 is a diagram of a vehicle charging system.

The wireless vehicle charging system 52 may be configured to detect a position of the receive coil 34 relative to the transmit coil 40. FIG. 2 illustrates one possible implementation of a vehicle charging system 52. A vehicle locating mechanism 100 may be included in the wireless vehicle charging system 52. The vehicle locating mechanism 100 may determine the position of the vehicle 12 within the vehicle charging system 52. The vehicle locating mechanism 100 may detect a location of one or more of the tires 22 within the area defined by the vehicle charging system 52.

The wireless vehicle charging system 52 may be configured with a plurality of transmit coils 140, 142, 144 to support charging of different vehicles. The transmit coils 140, 142, 144 may be selectively coupled to the power source 36 to transmit energy to the vehicle receive coil 34. The wireless vehicle charging system 52 may be configured to select the appropriate transmit coil 140, 142, 144 from the plurality of transmit coils.

The wireless vehicle charging system 52 may be configured to align the selected transmit coil (e.g., 140, 142, or 144) with the receive coil 34 of the vehicle 12 for maximum power transmission and minimum emissions. A transmit coil transport mechanism 102 may be included in the wireless vehicle charging system 52. The transport mechanism 102 may be configured to move the transmit coils (140, 142, 144) to various positions. The transport mechanism 102 may be capable of aligning the selected transmit coil (e.g., 140, 142, or 144) to the receive coil 34 to optimize the transfer of energy from the selected transmit coil (e.g., 140, 142, or 144) to the vehicle 12.

The wireless vehicle charging system 52 may be configured to automate the movement of the transmit coils (140, 142, 144) with minimal operator intervention. The advantages of such an automated system are numerous. The automated system allows the vehicle 12 to be parked in a normal manner with minimal attention from the operator. A further advantage of the wireless charging system 52 is that there is no need for a user interface within the vehicle 12. The automated system eliminates the need for precise parking of the vehicle 12 so that no parking aids are necessary. An automated parking system is not needed as the vehicle 12 does not need to be precisely aligned within the parking area. The automated charging system may be configured to function regardless of whether the vehicle 12 is placed in the parking spot in a forward or reverse direction.

The vehicle locating system 100 may be implemented in a variety of ways. One or more pressure sensitive tire pads or mats 104 may be included to locate the position of one or more tires 22 of the vehicle 12. Based on the position of the tires 22 on the tire pads 104, the location of the vehicle receive coil 34 in relation to the selected transmit coil (e.g., 140, 142, or 144) may be ascertained. In one implementation, a pair of pressure sensitive tire pads 104 may be provided to determine the position of the tires 22 on each side of the vehicle 12. The tire pad 104 may include a tire stop 106 to limit travel of the tire 22 in a given direction. The tire stop 106 may be a raised area of the tire pad 104 that prevents motion of tire 22 in one direction. The tire stop 106 may be integrated with the tire pad 104 or a separate piece that is attached to the tire pad 104.

The pressure sensitive tire pads 104 may be separated by a pad separator 112 that may be coupled to each of the tire pads 104. The pad separator 112 may be sized to maintain a desired spacing between the tire pads 104 and to maintain the tire pads 104 in a generally parallel orientation with one another. The pad separator 112 may function to keep the spacing between the tire pads 104 constant. A transport mechanism separator 114 may maintain a constant spacing between the pad separator 112 and the transmit coil transport mechanism 102. The pad separator 112 and the transport mechanism separator 114 may be hollow to facilitate routing cables throughout the vehicle charging system 52. The transport mechanism separator 114 may be coupled to the pad separator 112 and the transmit coil transport mechanism 102. The transport mechanism separator 114 may be aligned such that a center line of the transport mechanism separator 114 is halfway between the tire pads 104.

Figure 3:
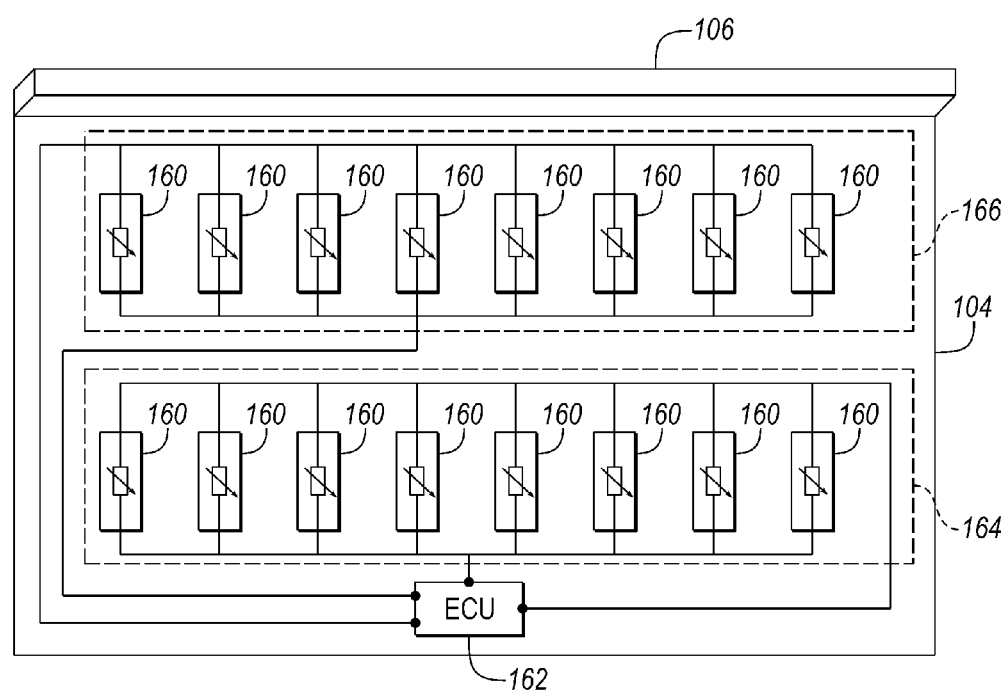
FIG. 3 is a diagram of a pressure-sensitive pad for locating a tire position.

FIG. 3 illustrates one possible implementation of a pressure sensitive tire pad 104. The tire pads 104 may contain a row or matrix of pressure-sensitive sensors 160. A first row 164 of pressure-sensitive sensors 160 may be incorporated into the tire pad 104. One or more additional rows (e.g., 166) of pressure sensitive sensors 160 may also be incorporated into the tire pad 104. The pressure sensitive sensors 160 may provide a signal indicative of a pressure applied by the tire 22 at the locations of the sensors 160. The pressure sensitive sensors 160 may be electrically connected to an electronic control unit (ECU) 162. The ECU 162 may be configured to provide power to the pressure sensitive sensors 160 and receive signals from the sensors 160. The signal from the pressure sensitive sensor 160 may be an analog signal that is proportional to the pressure applied to the sensor 160. The analog signal may be filtered and sampled by the ECU 162. The ECU 162 may measure a voltage associated with each of the pressure sensitive sensors 160. The voltage measured may be proportional to an amount of pressure applied by the tire 22 at the location of the pressure sensitive sensor 160. For example, pressure sensitive sensors 160 that are directly underneath the tire 22 may have a voltage that is greater than for pressure sensitive sensors 160 that are located to the side of the tire 22.

The voltage measurements may provide a distribution of pressure values from which the position of the tire 22 on the tire pad 104 may be determined. Each of the pressure sensitive sensors 160 may indicate a different pressure value depending on the position of the sensor 160 relative to the tire 22. The signals provided by the pressure sensitive sensors 160 may have a magnitude that depends on the proximity of the tire 22 to the sensors 160. As the position of the tire 22 on the tire pad 104 changes, the sensor 160 values may change. As the tire pad 104 deflects due to the transfer of the vehicle weight through a contact region of the tire, the sensor 160 values may change. A sensor 160 that is within the contact region of the tire may be expected to measure a greater value than a sensor 160 that is outside of the tire contact region.

The pressure sensors 160 may provide a digital signal (e.g., on or off) indicating whether the pressure applied by the tire 22 is above or below a predetermined threshold. That is, whether the tire 22 is located on the individual pressure sensor 160 or not. The position of the tire 22 may then be determined by the locations of the sensors 160 in which the signal is above the predetermined threshold.

The position of each sensor 160 in the tire pad 104 may be known in advance. The sensors 160 may be configured to be a fixed distance apart. Alternatively, the sensors 160 may be configured to be a variable distance apart. For example, small vehicles may have narrower tires and a smaller track (distance between the centerline of two wheels on the same axle) so the sensors 160 may be configured to be closer to one another on the inner portions of the tire pad.

The position of the tire 22 may be determined as a location on the tire pad 104 based on the known locations of the sensors 160. The tire position may be a relative position of the tire 22 with respect to the tire pad 104. An absolute position of the tire pad 104 within the vehicle charging system 52 may be known. The tire position may be expressed relative to the absolute position of the tire pad 104.

Once the tire position on the tire pad 104 is ascertained, the position of the receive coil 34 may be calculated. Using two pads 104 may ensure that the vehicle 12 is properly aligned in the lateral and longitudinal directions. The tire stops 106 may ensure that both tires 22 of the given axle are aligned to the same plane. The tire stops 106 may include one or more additional pressure sensitive sensors to indicate that a tire 22 is in contact with the tire stop 106. When the tires 22 are detected to be contacting the tire stops 106, a signal may be given to the operator that the vehicle 12 is in place on the tire pads 104. Alternatively, in an implementation without tire stops 106, the pressure sensitive sensors 160 on the tire pads 104 may be monitored to ascertain if both tires 22 are on the tire pads 104. When both tires 22 are detected to be on the tire pads 104, the operator may be alerted.

In order to accommodate a variety of vehicles, tire pads 104 may be arranged to accommodate a variety of track widths. The width between the tire pads 104 may be such that a range of vehicle track widths is accommodated. An inner portion of the tire pad 104 may be that portion that is closest to the other tire pad 104. An outer portion of the tire pad 104 may be that portion that is farthest from the other tire pad 104. For example, a narrow track width vehicle may be accommodated on the inner portions of the tire pads 104. That is, each tire 22 will come to rest on the inner portion of each tire pad 104. A wide track width vehicle may be accommodated on the outer portions of the tire pads. An actual track width of a vehicle 12 may be computed based on the position of the tires 22 on the tire pads 104. The computed track width may be utilized to confirm data sent from the vehicle 12.

The pressure sensitive sensors 160 may be an array of switches configured such that when the tire is located above the switch, the switch or contact closes. The ECU 162 may provide power or ground to a first contact of the switch. A second contact of the switch may be monitored by the ECU 162 to determine if the switch has closed. The second contact may be electrically biased toward power or ground depending on the configuration. For example, the switch may close when the tire 22 of the vehicle 12 is pressing down on the switch due to the weight of the vehicle. When the switch closes, the second contact may change voltage. A spring or other biasing element may cooperate with the base, cover and the switch to return the switch to the open position when the tire is removed from the tire pad 104.

The pressure sensitive sensors 160 may be based on strain gage sensors and provide a signal proportional to a deflection of the strain gage sensor. The ECU 162 may provide power and ground to the strain gages. As more weight is placed on the tire pad 104 at the location of the sensor 160, an amount of strain gage deflection may increase and the signal may increase in magnitude. An array of sensors 160 of this type may provide a distribution of signal magnitudes. The tire location may be determined as the location or locations having the highest magnitudes.

Figure 4A:
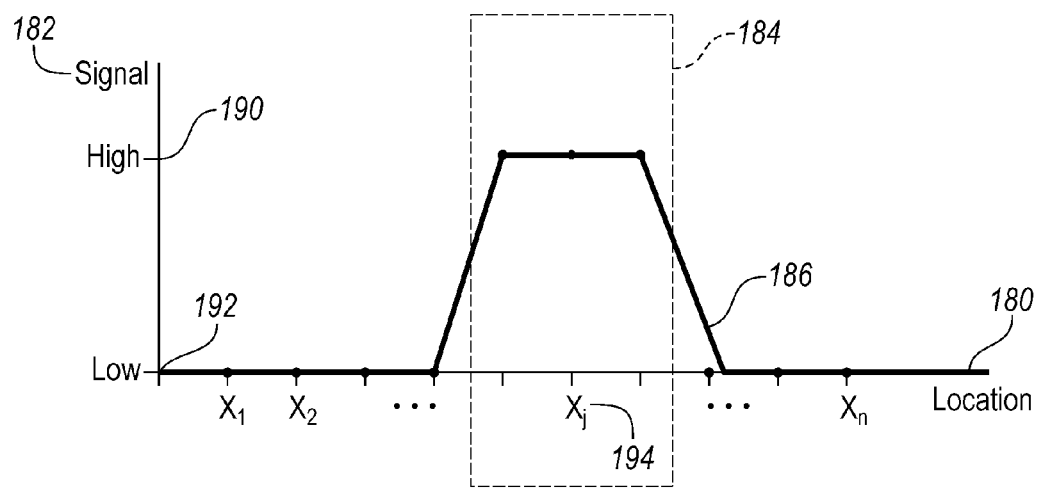
FIG. 4A is a graph showing pressure sensor signal magnitudes across the pressure-sensitive pad for sensors having two output states.

FIG. 4A depicts a graph of signals from pressure sensors 160 that are of a binary nature having one of two possible states. The x-axis 180 indicates the position of each sensor 160 across the tire pad 104. The y-axis 182 depicts the magnitude of the signal generated by the sensors 160 at the sensor locations. The tire contact patch 184 may be at particular locations on the tire pad 104. In this configuration, sensors 160 located within the tire contact patch 184 may provide a high signal 190. Sensors 160 located outside of the tire contact patch 184 may provide a low signal 192. A resulting curve 186 of signal magnitudes may be plotted.

Figure 4B:
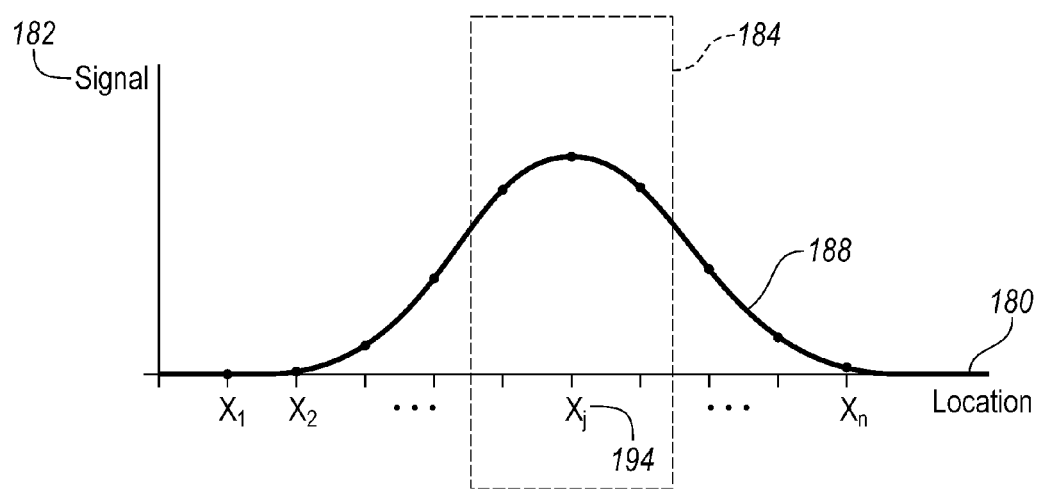
FIG. 4B is a graph showing pressure sensor signal magnitudes across the pressure-sensitive pad for sensors having analog outputs.

FIG. 4B depicts a graph of signals from pressure sensors 160 that provide an analog signal. The x-axis 180 indicates the position of each sensor 160 across the tire pad 104. The y-axis 182 depicts the magnitude of the signal generated by the sensors 160 at the locations. The tire contact patch 184 may be at particular locations on the tire pad 104. In this configuration, a sensor 160 located in the tire contact patch 184 may provide a signal having a higher magnitude. The signal magnitude may decrease as the distance between the sensor 160 and the tire contact patch 184 increases. A resulting curve 188 of signal magnitudes may be plotted.

The ECU 162 may determine the tire location on the tire pad 104 based on the distribution of the magnitudes. The tire location may be a location of the center of the tire 22. For example, in FIG. 4A, the tire location may be determined as $x_j$ 194 and may be the sensor that is in the middle of all sensors having a high value. In FIG. 4B, the tire location $x_j$ 194 may be determined as the sensor that has the highest magnitude.

The tire pad 104 may be constructed in a variety of configurations and different materials. The tire pad 104 may define a housing for the pressure sensors 160. The pressure sensors 104 may be attached to a base or substrate and a cover may protect the sensors 160 from damage and contaminants. The tire pad 104 may be constructed of a flexible material (e.g., rubber) with the pressure sensors 160 embedded within.

A position of the transmit coils 140, 142, 144 relative the tire pads 104 may be maintained by the EVSE controller 54. The relative position of the transmit coils 140, 142, 144 to the tire pads 104 may be measured or estimated. The transmit coils 140, 142, 144 may have a "home" position that is at a known position relative to the tire pads 104. The transmit coils 140, 142, 144 may be positioned in the home position after charging is completed or prior to starting charging. Movement of the transmit coils 140, 142, 144 may be prevented when there is no vehicle 12 present at the charging station 52. Additional sensors may be provided to detect if the charging station 52 is clear of objects or persons that may be harmed by movement of the transmit coils 140, 142, 144.

A communications link between the wireless vehicle charging system 52 and the vehicle 12 may be present. The communications link may be a wireless interface that allows data to be transferred between the vehicle 12 and the vehicle charging system 52. Standard wireless interfaces, such as wi-fi or Bluetooth, may be utilized for the communications link. The EVSE controller 54 may contain appropriate interface circuitry to communicate over the selected wireless interface.

A controller (e.g., system controller 48) in the vehicle may provide information via the communications link. The vehicle 12 may provide information regarding the make and model of the vehicle 12. The wireless vehicle charging system controller 54 may include a table of makes and models to determine the position of the vehicle receive coil 34 relative to the one or more of the tires 22 of the vehicle 12.

The vehicle 12 may provide information regarding the position of the receive coil 34 relative to the tires 22 of the vehicle 12. A longitudinal and a lateral distance may be provided to indicate the position of the receive coil 34 relative to the one or more of the tires 22.

The wireless vehicle charging system 52 may also communicate charging status information to the vehicle 12. An operator display in the vehicle 12 may indicate the charging status information to the vehicle operator. This may eliminate the need for external indicators that may be a part of the wireless vehicle charging system 52 and reduce the footprint of the wireless vehicle charging system 52.

The wireless vehicle charging system 52 may be configured to accept transmit coil location requests from the vehicle 12 for fine-tuning of the position of the transmit coil 40. The vehicle 12 may also make requests for non-standard locations of the receive coil 34. During charging, the vehicle 12 may measure the energy being transferred and, by making fine-tuning requests, may cause the transmit coil 40 to move in an effort to increase the energy being transferred.

The transport mechanism 102 for the transmit coil may move the transmit coils 140, 142, 144 to a commanded location. The transport mechanism 102 may provide lateral and longitudinal movement of the transmit coils 140, 142, 144. The transport mechanism 102 may also adjust the height of the transmit coils 140, 142, 144 relative to the vehicle 12.

A lateral centerline of the transport mechanism 102 may be generally centered between the two tire pads 104. The transport mechanism 102 may allow a range of lateral and longitudinal movement relative to the tire pads 104.

The specifications of the vehicle receive coil 34 may be different between vehicle manufacturers. Charging of the vehicle 12 may require a compatible transmit coil (e.g., one of 140, 142, 144). A wireless vehicle charging system 52 may accommodate multiple vehicles by providing multiple transmit coils 140, 142, 144. The wireless vehicle charging system 52 may provide transmit coils 140, 142, 144 that are compatible with a variety of vehicles. An advantage of such a configuration is that any vehicle may be charged by the system by selecting a transmit coil (one of 140, 142, 144) that is compatible with the vehicle receive coil 34.

FIG. 2 depicts a diagram of a possible transport mechanism 102 including a plurality of transmit coils (140, 142, 144). The transport mechanism 102 may include a carousel 150 or rotating platter with a plurality of transmit coils (e.g., 140, 142, 144) attached at various angular positions. The rotating platter 150 may be attached to a carriage or platform that rides on one or more rails 154. The rails 154 permit the carriage or platform with the rotating carousel 150 to slide longitudinally (e.g., front-back) beneath the vehicle 12. Rotation of the platter 150 allows a selected transmit coil (one of 140, 142, or 144) to be aligned with the vehicle receive coil 34. By moving the carriage or platform and rotating the carousel 150, the selected transmit coil (one of 140, 142, or 144) may be aligned with the vehicle receive coil 34.

The carousel 150 may be rotated about an axis 156. The carousel 150 may be coupled to a shaft located on the axis 156. The shaft may be further coupled to an electric motor that is coupled with the carriage or platform. The shaft and electric motor may be coupled through gears to adjust the rotational speed of the electric motor relative to the shaft. The electric motor may be controlled to rotate the shaft in a clockwise or counter-clockwise direction. Rotation of the electric motor causes the carousel 150 to rotate relative to the carriage or platform and the rails 154. The transmit coils 140, 142, 144 may rotate about the axis 156 to a selected position.

The height of the transmit coils 140, 142, 144 may be further adjustable. For example, the rail system 154 and rotating platter 150 may cooperate with a scissor jack mechanism to set the proper gap or distance between the selected transmit coil 140, 142, 144 and the vehicle receive coil 34. Alternatively, each transmit coil 140, 142, 144 may be attached to an individual coil lifting mechanism to provide the ability to lift each transmit coil 140, 142, 144 separately.

The transport mechanism 102 may include a housing 110. The housing 110 may enclose the rails 154, the carousel 150, and the transmit coils 140, 142, 144. The carousel 150 may include a cover that shields the transmit coils 140, 142, 144 from contaminants. The cover may be made of a material that does not interfere with the transmission of electrical energy between the transmit coils 140, 142, 144 and the receive coil 34.

A coordinate system may be defined for the vehicle charging system 52. A location within the vehicle charging system 52 may be chosen as a reference point. For example, a left-front corner of the left tire pad 104 may be selected as the reference point. The position of objects within the boundaries defined by the charging system 52 may be relative to this reference point.

A typical usage of the wireless vehicle charging system 52 may begin with an operator parking the vehicle 12 in the space defined by the wireless vehicle charging system 52. The operator may position the vehicle 12 such that the front tires 22 are located on the tire pads 104. The tire stops 106 may prevent further motion in a forward direction. With the tires 22 on the tire pads 104, the pressure sensors 160 may provide signals to the ECU 162. The signals may be analyzed to determine the position of the tires 22 on the tire pads 104. Based on the sensor data, coordinates of the center of the tire 22 may be determined. A distance between the center of the tire 22 and the reference point may be calculated to obtain an absolute tire location within the vehicle charging system 52.

A position of each transmit coil 140, 142, 144 relative the reference point may also be known. The position may be measured with sensors or may be calculated based on the angular and longitudinal positions of the carousel 150. A position of the each transmit coil 140, 142, 144 relative to the tire location may be determined based on the absolute tire location.

The controller 54 of the wireless vehicle charging system 52 may receive data from the vehicle. The data may be indicative of the position of the vehicle receive coil 34 relative to the center of the tire. Data indicative of the location of the receive coil 34 relative to the tires 22 may be received. For example, the data may indicate a longitudinal and lateral distance from the left front tire center to the receive coil. An absolute position of the vehicle receive coil 34 may be calculated based on the absolute tire location.

The controller 52 may also receive data indicative of a compatible transmit coil. Data indicative of the type of receive coil 34 that is present in the vehicle 12 may be received. The type of the receive coil 34 may be used to select one of the transmit coils 140, 142, 144 to be used for charging the vehicle 12. The controller 54 may maintain a table that maps receive coil types to a desired transmit coil.

Data indicative of the vehicle type, such as make, model and year, may be received. The controller 54 may maintain a table of vehicle data that maps each particular vehicle to a compatible transmit coil (one of 140, 142, 144). The table may also include information regarding the location of the receive coil 34 of the vehicle 12.

At this time, the controller 52 may know which transmit coil 140, 142, 144 is desired and the position at which the transmit coil 140, 142, 144 should be placed. The controller 52 may issue commands and signals to move the carriage or platform and rotate the carousel 150 to position the selected transmit coil 140, 142, 144 in the desired location. Once the selected transmit coil 140, 142, 144 is in the desired position, the selected transmit coil 140, 142, 144 may be energized to transfer energy to the receive coil 34. The vehicle 12 may monitor the charging operation to ensure that energy is being transferred properly.

The system controller 48 in the vehicle 12 may monitor the charging operation. The system controller 48 may compute the amount of energy being transferred and determine if more energy transfer is possible. A predetermined nominal energy transfer amount may be known and the vehicle controller 48 may compare the present energy transfer to the nominal energy transfer. If more energy transfer is possible, the vehicle controller 48 may send a request to the charge controller 54 to reposition the selected transmit coil 140, 142, 144. The charge controller 54 may issue commands to move the transmit coil 140, 142, 144 to a new position and the vehicle controller 48 may check the status. This process may be repeated until a maximum energy transfer is achieved.

The vehicle 12 may send a signal that indicates when charging is completed. The charge controller 54 may then de-energize the transmit coil 140, 142, 144 and move the carousel 150 into a different position to allow the vehicle 12 to leave the charging station 52.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle charging system comprising:
   a carousel, including a plurality of transmit coils, configured to move in a longitudinal direction and rotate about an axis; and
   a controller programmed to receive from a vehicle a type of a receive coil disposed in the vehicle, select one of the transmit coils mapped to the type, and cause the carousel to move and rotate to align the one of the transmit coils with the receive coil.

2. The vehicle charging system of claim 1 wherein the controller is further programmed to move the carousel and rotate the carousel in response to receiving a location of the receive coil from the vehicle.

3. The vehicle charging system of claim 1 further comprising a lifting mechanism coupled to the carousel for changing a height of the transmit coils, wherein the controller is further programmed to operate the lifting mechanism to change the height of the transmit coils such that a distance between the one of the transmit coils and the receive coil is changed.

4. The vehicle charging system of claim 1 further comprising a tire location detector configured to output a position of at least one tire of the vehicle, in contact with the tire location detector, relative to a reference point of the vehicle charging system, wherein the controller is further programmed to receive the position and move and rotate the carousel based on the position of the at least one tire.

5. The vehicle charging system of claim 1 wherein the controller is further programmed to receive data from the vehicle indicative of a location of the receive coil relative to a tire of the vehicle, and move and rotate the carousel to align the one of the transmit coils with the receive coil based on the location of the receive coil.

6. The vehicle charging system of claim 1 wherein the controller is further programmed to, in response to a command received from the vehicle to adjust a position of the one of the transmit coils, move and rotate the carousel to adjust the position of the one of the transmit coils according to the command.

7. A vehicle charging system comprising:
   a controller programmed to
      receive a type and a position associated with a vehicle receive coil from a vehicle and a tire position from a tire location detector, and
      cause a carousel, including a transmit coil mapped to the type, to move and rotate based on the tire position and the position such that the transmit coil aligns with the vehicle receive coil.

8. The vehicle charging system of claim 7 wherein the controller is further programmed to cause a lifting mechanism to change height of the transmit coil relative to the vehicle receive coil to change a distance between the transmit coil and the vehicle receive coil.

9. The vehicle charging system of claim 7
   wherein the controller is further programmed to receive a positioning command from the vehicle and
   cause the carousel to move and rotate based on the positioning command.

10. The vehicle charging system of claim 7 wherein the position is a distance of the vehicle receive coil from a location of a tire of the vehicle.

11. The vehicle charging system of claim 7 wherein the type associated with the vehicle receive coil is one or more of a vehicle identifier and a transmit coil identifier.

12. A vehicle charging system comprising:
a carousel, including a plurality of transmit coils, configured to move in a longitudinal direction and rotate about an axis; and
a controller electrically coupled to the carousel and programmed to, in response to receiving, from a vehicle, a type and a position associated with a receive coil of the vehicle, move and rotate the carousel according to the type and the position to align one of the transmit coils that is mapped to the type with the receive coil.

13. The vehicle charging system of claim 12 wherein the position is from a present position of the one of the transmit coils.

14. The vehicle charging system of claim 12 further comprising a lifting mechanism coupled to the carousel and electrically coupled to the controller for changing a height of the transmit coils, wherein the position includes a height adjustment, and wherein the controller is further programmed to operate the lifting mechanism according to the height adjustment.

15. The vehicle charging system of claim 12 wherein the controller is further programmed to receive from the vehicle an amount of energy transferred from the one of the transmit coils to the receive coil.

16. The vehicle charging system of claim 15 wherein the controller is further programmed to move and rotate the carousel to maximize the amount of energy transferred from the one of the transmit coils to the receive coil.

17. The vehicle charging system of claim 12 wherein the controller is further programmed to align the one of the transmit coils with the receive coil by moving the carousel a minimum amount in the longitudinal direction.

18. The vehicle charging system of claim 12 wherein the controller is further programmed to align the one of the transmit coils with the receive coil by rotating the carousel a minimum amount about the axis.

19. The vehicle charging system of claim 12 wherein the controller is further programmed to position the one of the transmit coils by moving the carousel a minimum distance in the longitudinal direction and by rotating the carousel a minimum rotational distance about the axis.

* * * * *